Jan. 17, 1967   D. R. TOMPKINS ETAL   3,299,350
ROTATING PIPE INSPECTION ASSEMBLY WITH SOLENOID OPERATED
MEANS TO RAISE AND LOWER THE SENSOR MEANS
Filed Feb. 24, 1964   2 Sheets-Sheet 1

David R. Tompkins
Lemuel L. Council
INVENTORS

BY Hayden & Pravel

ATTORNEYS

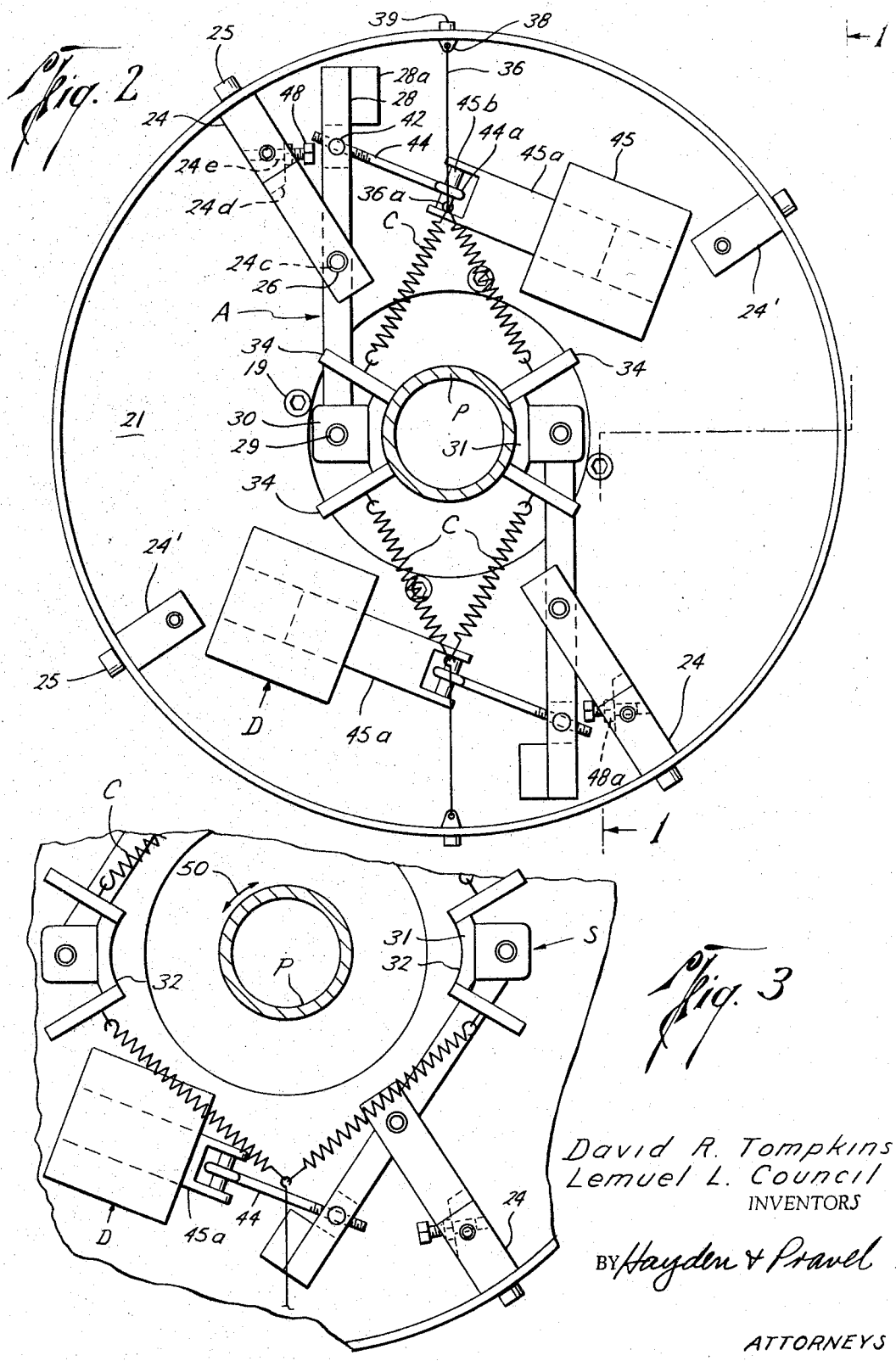

United States Patent Office 3,299,350
Patented Jan. 17, 1967

3,299,350
ROTATING PIPE INSPECTION ASSEMBLY WITH SOLENOID OPERATED MEANS TO RAISE AND LOWER THE SENSOR MEANS
David R. Tompkins and Lemuel L. Council, Houston, Tex., assignors to Plastic Applicators, Inc., a corporation of Texas
Filed Feb. 24, 1964, Ser. No. 346,658
1 Claim. (Cl. 324—37)

This invention relates to a rotating pipe inspection assembly which positions sensor means adjacent the outer surface of a circumferentially magnetized tubular member, and more particularly, to a rotating assembly wherein sensor means are passed through the magnetic field exterior the outer surface of the tubular member to intersect maximum magnetic flux variations indicative of flaws, voids, seams, and other structural anomalies extending longitudinally or axially of the tubular member, even when said tubular member is susceptible of crooks, bends, flanges, upsets, and other departures from uniform cylindrical shape.

This invention pertains to rotating pipe inspection apparatus which carries inspection sensors for detection of flaws in ferromagnetic tubular members. Various means, such as an axially disposed electrical conductor, are used to produce circumferential magnetic flux in the wall structure of tubular members wherein said magnetic flux intersects or is interrupted by longitudinally or axially extending flaws, seams, and other structural anomalies of the tubular member. Flaw signal detection is enhanced when a given flaw intersects a maximum number of circumferentially extending magnetic lines of flux which intersection therefore causes the largest possible magnetic field disturbances exterior the outer surface of the tubular member. Disturbances exterior the outer surface of the tubular member are detected or sensed by passing inductive coils or similar devices through the magnetic field variations to induce variable voltages indicative of and related to the magnetic field variations. It may be appreciated that maximum voltage variations are induced by utilizing magnetic coils having relatively long side portions which extend parallel to the ferromagnetic item under inspection. This invention provides means for positioning the detector means parallel to the axis of the tubular member and more particularly provides means which scan the entire outer surface of the tubular member by rotating and translating the detector means relative to the tubular member to evolve helical motion thereabout to inspect the outer surface of the tubular member.

Certain devices of the prior art have limitations and are not able to follow the exterior surface of, for example, a used oil well casing member which is twisted and has flanges extending from the outer surface. As a matter of fact, some prior art devices are essentially strapped or secured about a given tubular member and are unable to inspect additional tubular members when the initial tubular member varies in diameter at a flange or upset which locks the inspection apparatus on the tubular member. Further, prior art devices have generally moved relative to the tubular member which fact necessitates long lead wires and other electrical means of communicating to the indicating apparatus used with the detection means. Also, many devices of the prior art have performed longitudinal flaw inspection utilizing D.C. and even A.C. bias sources and other such means which have required additional sources of voltage including batteries and oscillator circuits. This invention provides inspection apparatus which automatically engages a tubular member upon relative motion therebetween and thus is not hand lifted or physically shifted from an inspected tubular member to another tubular member which step has, in the past, required opening and closing of latches or other fastening means. The rotating pipe inspection assembly of this invention provides uniform inspection which results from constant or controlled positioning of the detector means carried thereby relative to the outer surface of the tubular member without the use of D.C. or A.C. bias means so that no variation occurs from portion to portion as does in prior art devices where crooks and bends shift the pipe relative to the various portions of the apparatus. Additionally, this invention provides maximum signal amplitude by positioning the detector means uniformly adjacent to the other surface of the tubular member so that maximum magnetic field variations are sensed thereby.

Therefore, an object of this invention is to provide a new and improved pipe inspection apparatus which inspects tubular members with flaws, seams, pits, and other structural anomalies extending longitudinally or axially of the tubular member.

A further object of this invention is to provide a new and improved rotating pipe inspection assembly which carries pipe inspection detectors along the outer surface of the tubular member in spite of crooks, bends, flanges, and upsets, and other departures from uniform cylindrical shape.

Yet another object of this invention is to provide a new and improved magnetic pipe inspection assembly which automatically engages and inspects longitudinally extending members on relative motion therebetween without handling of the inspection apparatus.

Still another object of this invention is to provide a new and improved rotating pipe inspection assembly which does not utilize bias magnets and is not connected to oscillator circuits for supply of A.C. bias voltages.

A further object of this invention is to provide a rotating pipe inspection assembly having a sensor shoe suspension system which lifts the sensor shoe from the outer surface of the tubular member when the tubular member is moving longitudinally of the inspection assembly and not subject to inspection.

Other objects and advantages of the present invention will become readily apparent from a consideration of the following description and drawings wherein:

FIG. 2 is an axial view of the rotating assembly relative to a tubular member which is related to the sectional view of FIG. 1 by the cut line 1—1; and FIG. 3 is a view similar to FIG. 2 illustrating the relation of the parts when actuated to a noninspecting position.

Figure 1:
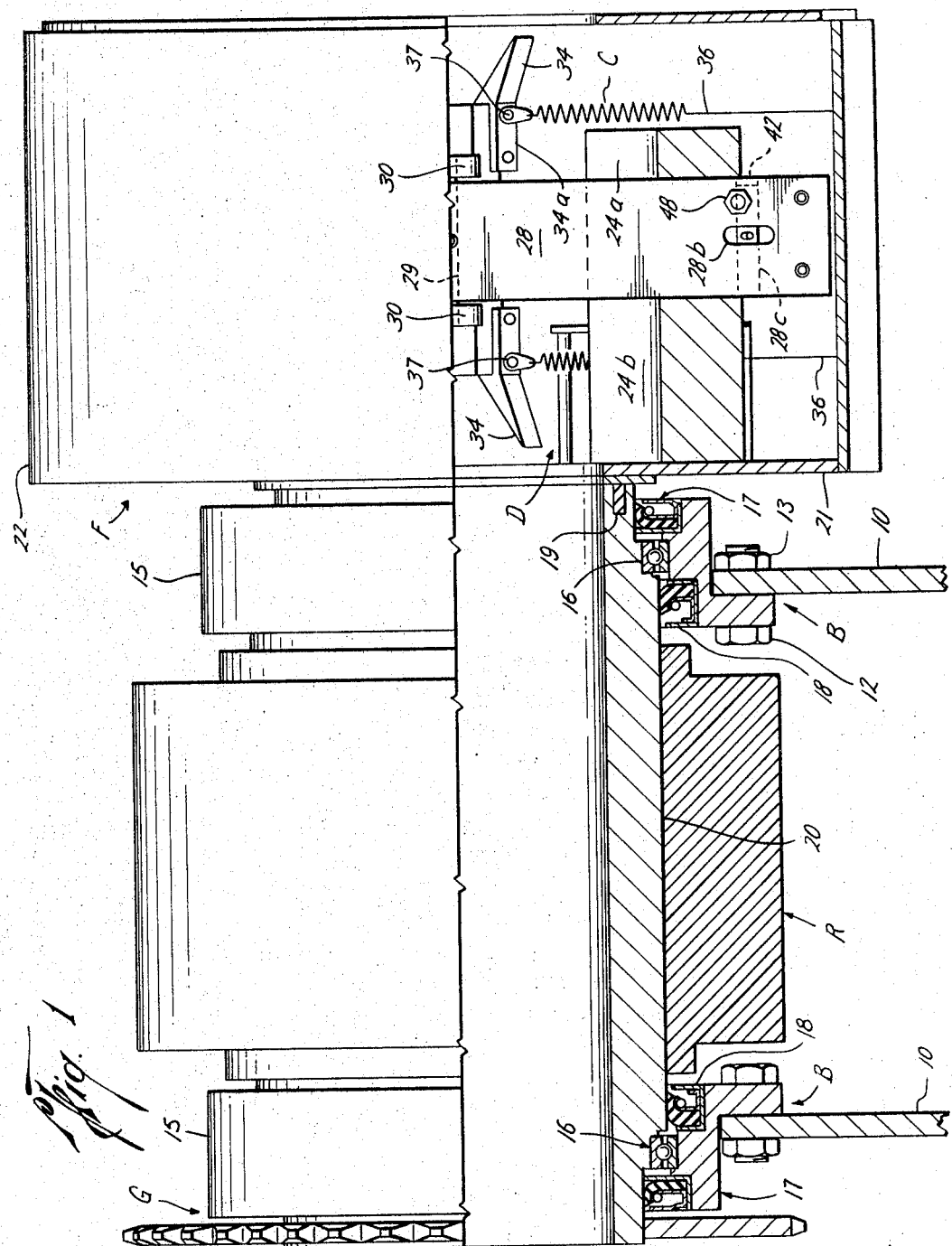
FIG. 1 is a plan view of the rotating head assembly with a section taken along a horizontal line to reveal details within the assembly.

In the drawings, the letter B generally designates a mounting bracket and the letter R generally denotes a slip-ring assembly which is positioned between a pair of the mounting brackets B. A sprocket or gear G is connected to the slip-ring assembly R adjacent one of the brackets B and is adapted to impart rotation thereto when rotated (by any suitable means) about the pipe P. A frame F is connected to the sprocket G through the slip-ring assembly R and rotates with the sprocket G to carry or rotate a plurality of sensor shoes S about the pipe P. Each sensor shoe S is preferably mounted on the end of a lever or mounting arm A and is urged into contact with the outer surface of the pipe P by tension in a plurality of coil springs C. Additionally, dynamic means D such as the solenoids which are illustrated in a working relationship with the lever arms A controllably lift the sensor shoes S from the illustrated position adjacent the outer surface of the pipe P for purposes which will become more obvious hereinafter.

The brackets B enable the assembly to be secured relative to means for moving the pipe P longitudinally through the rotating pipe inspection assembly as will become more evident hereinafter and include a connecting member 10 which is secured to any suitable fixed object. Each connecting member 10 has an opening through which the shaft of a bolt 12 is passed to threadedly engage a nut 13 which secures the connective member 10 to a cylindrical guide 15 which remains stationary while supporting the slip-ring assembly R therein. The cylindrical guide 15 includes friction reducing means such as the bearing assembly indicated generally at 16 which is sealed from small particles of foreign matter by the rotating seals indicated at 17 and 18. The friction reducing means indicated at 16 is seated on a longitudinally extending sleeve 20 which is rigidly secured to the sprocket or gear G and rotates therewith. The sleeve 20 at the end opposite the rotating sprocket G is connected to the backing plate 21 of the frame F by any suitable means such as the bolts 19 which secure the plate 21 to the sleeve 20. The plate 21 is circular in shape and a right cylindrical, hollow sleeve 22 is connected to the outer circumference of the plate 21. The plate 21 and the sleeve 22 are each connected to longitudinally extending ribs which are attached to the plates by the bolts 25 or any other suitable means. In the preferred embodiment, four ribs extend longitudinally on the inner surface of the cylindrical plate 22 with two of the ribs indicated by the number 24' and two of the ribs indicated by the number 24. The ribs 24 have inwardly extending projections 24a and 24b which are spaced apart from one another, and each projection has an opening or hole 24c drilled at an aligned location to receive a pin 26. The pin 26 is flanged at each end after the pin is inserted in the projections 24a and 24b to provide a rotatable pivot for the lever arm assembly A. The arm 28 is positioned between the projections 24a and 24b to enable the pin 26 to engage a hole (not shown) in the arm 28.

The arm 28 extends toward the pipe P and is connected at the nearer end to the sensor shoe assembly S by means of a pin 29 which is passed through a pair of perpendicularly extending flanges 30 of the shoe assembly S. The flanges 30 are formed on an arcuate sensor mounting member 31 having an inner, curved surface 32 which is adapted to contact the outer surface of the pipe P. It may be appreciated that the sensor means customarily positioned longitudinally on the face 32 to detect flaws, seams, and other structural anomalies in the structure of the pipe P are coils of wire or other conducting material which are shown in FIGS. 2 and 3 as edge views.

The preferred embodiment utilizes two sensor shoe assemblies S which are semi-independently mounted on opposite sides of the pipe P and adapted to contact the pipe P as the pipe P enters or moves longitudinally of the inspection assembly. More specifically, contact of the shoe assemblies S with the pipe P is controlled by longitudinally and radially extending bumper guides 34 which are preferably placed at each corner of the sensor mounting members 31, which are generally rectangular in shape. The bumper guides 34 extend axially of the rotating inspection apparatus so that the pipe P first engages the bumper guides as it moves longitudinally of the equipment in either axial direction. It will be appreciated that after contact the bumper guides aid the sensor mounting members 31 in seating adjacent the outer surface of the pipe P as illustrated in FIG. 2 to accomplish automatic engagement or feeding of the pipe P for inspection.

The sensor shoe assemblies S are each held perpendicular to the surface of the pipe P by the coil springs C which are connected to the sensor shoe assembly S by means of a screw 37 and perforated washer which is threaded into the bumper guide 34 at the shoulder 34a. As mentioned, a coil spring C is connected to each of the bumper guides 34 and two coil springs, one from each of the sensor shoes S, are connected together in the eyelet 36a of a wire anchor 36. The wire anchor 36 is connected through a hole for receiving the wire in a tab 38 which is bolted to the cylindrical plate 22 by a bolt 39. As is more clearly shown in FIG. 1, coil springs C are attached at both ends of the sensor shoes S to longitudinally stabilize the sensor shoe S through the independently acting forces applied by the coil springs C.

The lever arm 28 is equipped with a counterbalance 28a at the end opposite the sensor shoe S to offset any torques created about the pivot 26. The arm 28 also has an oval-shaped opening 28b near the counterbalance 28a and an intersecting opening 28c extends through the larger dimension of the arm and is adapted to receive a pin 42 therethrough. The pin 42 passes through the oval opening 28b to position an opening in the center of the shaft in the oval slot 28b which is threaded and adapted to engage a push rod 44. The push rod 44 has a hook 44a at or near the opposite end which is rotatably engaged with the fulcrum shaft 45b which is appended to the armature 45a which slidably moves in the solenoid 45 of the dynamic means D. The solenoid 45 operates in response to the flow of electrical current in the conventional manner to pull the rod 44 towards the solenoid and rotate the lever arm 28 about the pivot pin 26. Each of the ribs 24 having inwardly extending projections 24a and 24b has an angularly oriented surface between the flanges 24a and 24b which is indicated by the dotted line representation at 24d in FIG. 2. The surface 24d provides a seat for receiving a stop 48 which is comprised of a bolt which is threadly engaged with an opening 24e in the rib 24. If desired, a lock nut 48a may be threaded on the shaft of the bolt 48 to abut the surface 24d and lock the bolt in the illustrated position.

The rotating pipe inspection assembly of this invention is installed in axial alignment with suitable means for longitudinally moving tubular members and elongate objects for inspection. The pipe P is circumferentially magnetized utilizing any suitable means to form residual magnetic flux which extends circumferentially in the structure of the pipe P as indicated by the arrow 50 in FIG. 3. Such installation is generally accomplished by securing the connecting members 10 to any suitable fixed object relative to the path followed by the longitudinally moving pipe P so that the pipe P will pass through the rotating assembly of this invention as illustrated in FIGS. 2 and 3. Such installation requires that a chain or gear drive be cooperatively engaged with the sprocket G to rotate the frame F and the associated inspection assembly about the pipe P to scan or sense magnetic field variations exterior the pipe P. Also, the slip-ring assembly R, which is customarily a sealed unit, is connected to appropriate electrical wiring which supplies current for actuation of the dynamic means D and which also includes signal paths for connecting the sensors mounted on the shoe assemblies S to appropriate indicating equipment. The electrical wiring mentioned herein has been omitted from the drawings to avoid crowding and loss of clarity which would result from the inclusion of the wires, slip rings, and other associated electrical connections.

In operation, the rotating pipe inspection assembly of this invention is rotated by applying torque to the sprocket G which rotates the attached tubular member 20 and the frame F. The apparatus rotates in the path of the longitudinally moving pipe P which is progressively carried along the center line of the frame F to engage the bumper guides 34 which extend toward the pipe P. It may be appreciated that, before contact, the coil springs C urge the sensor shoes S toward the center line of the frame F to rotate the lever arms 28 about the pivot pins 26 until the lever arms 28 contact the stop means 48. The forward edge of the leading end of the pipe P contacts the bumper guides 34 on continued movement to automatically position the sensor shoes adjacent the outer surface of the pipe P so that each face 32 carries the sensor means as close as possible to the structure of the pipe P. As illustrated, the sensor shoes S have resilient means at each corner urging the sensor shoes radially inwardly of the pipe P so that, as the pipe P progresses through the apparatus, the full length of the sensor shoes is seated against the outer surface of the pipe P as illustrated in FIG. 2.

The force exerted by the coil springs C on the sensor shoes S tends to perpendicularly align the sensor shoes S with respect to the outer surface of the pipe P so that the face 32 of the sensor shoe assembly S positions the sensor means as close as possible to the surface of the pipe P for the full length of the sensor means. Since the frame F is rotated by the torque applied to the sprocket G, the sensor shoes are also rotated about the longitudinally moving pipe P to develop helical motion with respect to the pipe P. The motion preferably has a helix angle of about 45 degrees which would result from equating relative axial velocity of the pipe P to the relative velocity existing between the sensor means and the outer surface of the pipe P. The helix angle of the relative motion of the sensor means with respect to the pipe P may be utilized along with the length of the sensor means to enable calculation of the angular velocity of the frame F and the linear velocity of the pipe P. Since the preferred embodiment includes two sensor mounting members 31, the helical sweep of one sensor means may be used to overlap the helical sweep of the other sensor means to fully inspect all portions of the outer surface of the pipe P at least once.

The pipe inspection assembly of this invention is particularly adapted to inspect tubular members in less than ideal conditions. Considering an example, the pipe P need not be centralized with respect to the frame F to insure complete inspection of the pipe P, but rather the lever arms 28 and the coil springs C cooperatively reposition the sensor means to inspect the pipe P. Thus, if the pipe P were to move toward the right side of FIG. 2, the coil springs attached to the sensor mounting member 31 on the right side of the drawing would deflect from the illustrated position to laterally shift the sensor mounting member 31 tending to maintain the sensor shoe perpendicular to the outer surface of the pipe P and would additionally react on the coil springs attached to the sensor mounting member 31 on the left side of the drawing to urge that movable assembly into contact with the outer surface of the pipe P. As a further example, if the pipe P were to move toward the top of FIG. 2, the sensor shoe assemblies S would rotate about the pivot pins 29 in response to the urging of the coil springs C to maintain the sensor shoe assemblies S perpendicular to the outer surface of the pipe P. The two sensor shoe assemblies S of the preferred embodiment would not be diametrically displaced from one another relative to the pipe P and would be less than 180 degrees apart from one another on the lower side of the pipe P. This fact would not alter the inspection process, for the sensor means carried by the sensor shoes S would continue to move helically about the pipe P to inspect the structure thereof and only the amount of overlap of inspection of the two sensor means carried by the preferred embodiment would be altered.

The apparatus of this invention is additionally adapted to continue inspection of the pipe P even if the pipe P is crooked, bent, or has other departures from the pipe P illustrated in the drawings D. For instance, if the pipe P were crooked, the above mentioned examples illustrate that the inspection apparatus is adapted to continue inspection as the crooked portion passes through the inspection equipment and it is to be noted that the movements of the above mentioned examples may occur simultaneously on inspection of various crooked tubular members. Additionally, the apparatus is adapted to follow the outer surface of the pipe P even if the pipe P has flanges, upsets, and other abrupt changes in diameter. It may be appreciated from the drawings and the disclosure contained herein that the sensor mounting means illustrated in the drawings will tend to contact the outer surface radially of the pipe P regardless of the diameter of the pipe P. Thus, if the pipe P moves longitudinally of the inspection equipment and has an abrupt change of diameter, the bumper guides 34 will, when contacted, ride over the abrupt change in diameter of the pipe P to position the sensor shoes S against the outer surface of the pipe P regardless of the diameter thereof.

The sensor mounting shoe assemblies S are illustrated in the drawings as having bumper guides 34 pointing longitudinally of the apparatus in both directions so that the apparatus may inspect pipe moving longitudinally thereof from both directions. Because of possible requirements of associated equipment, it may be desirable and sometimes necessary to move or translate the pipe P through the inspection apparatus of this invention in both directions so that the pipe P may be inspected as it moves in one direction and on completion of the movement in the original direction, the inspection sensors may be lifted from the outer surface of the pipe P to the position illustrated in FIG. 3 by operation of the dynamic means D. Application of electrical current to the solenoids 45 moves the armature portions 45a of the solenoids to impart motion to the pushrods 44 to rotate the lever arms 28 about the pivot pins 26. The solenoids 45 move the armatures 45a to the seated positions in the solenoids illustrated in FIG. 3. Then, the sensor shoe assemblies S are withdrawn to the position illustrated in FIG. 3 where the sensor shoes are removed from contact with the outer surface of the pipe P and the pipe P may be translated longitudinally of the inspection apparatus of this invention without duplicate inspection or for any other reason as judged by the operator of the apparatus.

Certain alterations may be incorporated in the inspection equipment without departing from the invention contained herein. The solenoids 45 may be omitted from the inspection apparatus if desired so that the sensor shoe mounting assemblies S are contacted against the outer surface of the pipe P at all times. Of course, the lever arms 28 may be altered to any extent as well as the coil springs C so long as means against the outer surface of the pipe P. Such alteration may be further extended to the frame F where, for instance, the cylindrical plate 22 may be deleted if desired. On the other hand, the large frontal opening of the cylindrical plate 22 may be materially reduced by placing a plate therein which has a centralized opening for passage of the pipe P therethrough if it is found desirable to further shield and cover the moving parts of the invention. Also, additional inspection shoes may be utilized to more fully or rapidly inspect the surface of the pipe P.

Broadly, this invention relates to a rotating inspection assembly which senses flaws in the structure of elongate objects by passing sensor means adjacent thereto to detect variations in the magnetic field.

We claim:

Apparatus having a frame for passing longitudinally moving, circumferentially magnetized tubular members therethrough to detect flaws, voids, seams, and other structural anomalies in the tubular members including:

(a) a pair of sensor shoes;

(b) means supported by the frame for accommodating movement of said sensor shoes relative to the center line of the frame in response to movement of the tubular members relative to the center line of the frame as the tubular members pass therethrough;

(c) means for urging said sensor shoes toward the tubular members to maintain said sensor shoes in contact with the outer surface of the tubular members whether or not the tubular members remain in the center line of the frame as the tubular members move therethrough;

(d) means for rotating the frame and said sensor shoes about the longitudinally moving tubular members to sense variations in the magnetic field exterior of the tubular members;

(e) said means that is supported by the frame for accommodating movement of said sensor shoes relative to the center line of the frame including a pair of arms pivotally supported between their ends to the frame so that each may pivot about a fixed axis which is parallel to the axis of the longitudinally moving tubular members, and one end of each of said arms being pivotally secured to one of said sensor shoes so that each of said shoes may pivot about an axis that is parallel to the axis of the longitudinally moving tubular members; and (f) a pair of solenoid means supported by the frame and each being pivotally connected, respectively, adjacent the other end of each of said arms whereby said arms may be moved substantially simultaneously about the pivot between their ends for engagement of said sensor means with the outer surface of the tubular members for inspection thereof as the tubular members move through the frame and said solenoid means also operable substantially simultaneously to disengage each of said sensors from the outer surface of the tubular members when desired.

References Cited by the Examiner
UNITED STATES PATENTS

| | | | |
|---|---|---|---|
| 2,582,440 | 1/1952 | Keaton et al. | 324—37 |
| 2,878,447 | 3/1952 | Price et al. | 324—37 |
| 2,882,488 | 4/1959 | Price et al. | 324—37 |
| 2,886,772 | 5/1959 | Gresham et al. | 324—37 |
| 3,066,254 | 11/1962 | Price et al. | 324—37 |
| 3,202,914 | 8/1965 | Deem et al. | 324—37 |

WALTER L. CARLSON, *Primary Examiner.*

R. J. CORCORAN, *Assistant Examiner.*